United States Patent [19]

Bowers

[11] Patent Number: 4,537,150
[45] Date of Patent: Aug. 27, 1985

[54] DATA ENTRY SYSTEMS

[76] Inventor: David L. Bowers, 9385 La Suvida Dr., La Mesa, Calif. 92041

[21] Appl. No.: 579,722

[22] Filed: Feb. 13, 1984

[51] Int. Cl.³ .......................... A01J 5/00; G01F 17/00
[52] U.S. Cl. .................................. 119/14.17; 73/427; 40/300
[58] Field of Search ...................... 119/14.17, 106, 156; 235/462, 470; 40/300, 301, 303, 304; 73/323, 427, 428

[56] References Cited

U.S. PATENT DOCUMENTS 3,163,047 12/1964 Jaquith .......................... 119/14.17 X
3,952,438 4/1976 Propst et al. ........................... 40/300
4,204,639 5/1980 Barber et al. ...................... 40/2 R X

FOREIGN PATENT DOCUMENTS 10486 4/1980 European Pat. Off. .............. 40/301

OTHER PUBLICATIONS

"Electronic Identification Method", B. C. Dillon, IBM Technical Disclosure Bulletin, vol. 20, No. 11B, Apr. 1978.

Primary Examiner—Robert P. Swiatek
Attorney, Agent, or Firm—Woodcock, Washburn, Kurtz, Mackiewicz & Norris

[57] ABSTRACT

Bar codes are shown for measurement of volumes of liquids, e.g., the amount of milk collected in a dairy milking operation, and correlation therewith to identification of the source of the liquid, such as a cow. In the preferred embodiment, infrared or laser scanners are used to scan the two bar codes to provide an input to a computer for correlating the container or the source of liquid with the volume of liquid, whereby complex volume measuring devices and operator measurements can be substantially eliminated. Similar techniques can be used to provide computer input data representing a wide variety of analog inputs; e.g., by providing a bar code scale for juxtaposition to a thermometer, the segments of the code along the scale being selected in accordance with the mercury level at a given temperature, simple analog-to-digital temperature data conversion and input is obtained.

10 Claims, 5 Drawing Figures

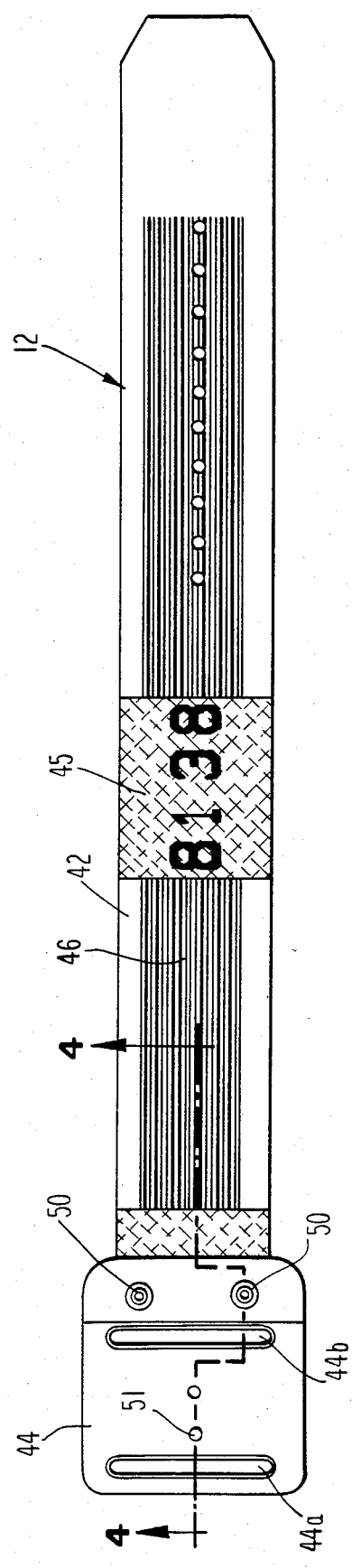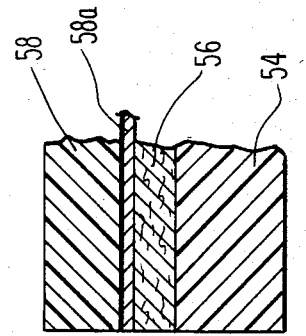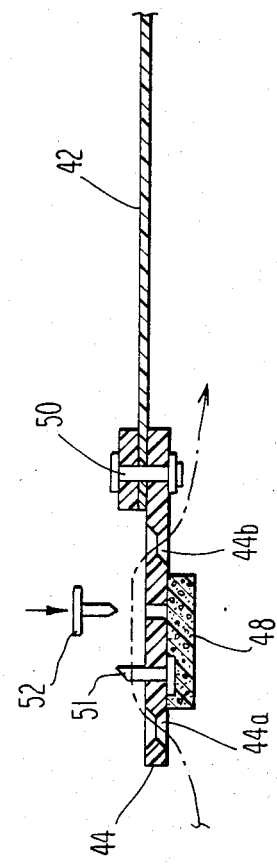

DATA ENTRY SYSTEMS

FIELD OF THE INVENTION

This invention relates to improved methods and apparatus for data entry into computer systems. More particularly, the invention relates to use of bar coded identifications of items, such as vessels, and of quantities or qualities, such as the amount of liquid in a vessel or its temperature, for ready and accurate entry into a computer system for processing. In a preferred embodiment, discussed in detail, bar codes are utilized for data entry as applied to the dairy industry.

BACKGROUND AND OBJECTS OF THE INVENTION

The recent and well publicized reduction in cost of computer equipment and software has led to the application of these devices to an ever-increasing range of use. One prime example of computerization in recent years has been the application of computer technology to agriculture. For example, systems are now commercially available in which a computer is informed when a given cow has approached a feeding station. The computer then consults its memory as to the correct amount of food to be dispensed to that particular animal and supplies the food. This information can then be correlated with the amount of the milk produced by the cow, and her feed allotment can be increased or decreased as necessary.

However, this system still has significant room for improvement. For example, the amount of milk given by a particular cow is determined by weighing. This process has now been computerized to the extent that electronic weighing devices are available which weigh the milk and record the amount, cross-indexed to the identification of the cow, such that the correlation is computerized. However, the electronic weighing apparatus made available to date is quite cumbersome and expensive.

To date there has been developed no fully automatic milking machine, i.e., in which no human is required to attach the milk receptacles to the udders of the cow. Accordingly, a farmer is still required to assist each cow with milking, and must be in the proximity to the cow during the milking process. This being so, the complex and expensive electronic weighing devices can be dispensed with as a means of data entry if the farmer can instead be provided with a simple way of entering the amount of milk produced by the cow into the computer. That is to say, if the farmer can be enabled to enter the amount of milk taken from a given cow on a particular day without substantially complicating his tasks, the complex and expensive weighing device can be eliminated, with substantial economies thus realizable in the dairy industry.

It is accordingly an object of the invention to provide an apparatus for the measurement of the milk output by a cow in a given milking session, wherein the fact that a human operator is of necessity in the vicinity of the cow after the milking operation is utilized, yet in which the additional duties required of the human operator are relatively small.

It is another object of the invention to provide means and apparatus for measurement of milk output by a cow in a given milking session in which actual weighing of the milk is avoided, and in which the weight data is provided in a form which is directly acceptable by a computer, without necessity of a human operator's making note of the amount.

As is well known, recent developments in bar code technology have rendered these devices useful in ever-widely expanding fields, just as in the case of computers, as discussed above. The prior art shows numerous new applications for bar code technology. The present invention provides an additional such new use, identification of dairy animals by bar code reader. Use of bar codes to identify dairy animals according to the invention requires that the prior art bar code labels be improved to be more durable, fool-proof and easily installable than has previously been possible, and this is accordingly an additional object of the invention.

One drawback to the bar code labels as conventionally produced is that they are typically required to be pre-printed by a manufacturer thereof and would ordinarily be stocked in all the various permutations of numbers required. It is an object of the invention instead to provide a means and method for printing bar code labels using relatively inexpensive personal computer devices, whereby the bar code labels can be customized to the user's specific wants and needs.

The ultimate object of the invention is to provide systems for data entry in agricultural and other applications using bar code technologies, and in which bar codes are used, for example, to measure quantities of materials and to identify the location, source or other attribute of the materials, so that a computer can be simultaneously provided with information as to, e.g., the amount of material stored in a given vessel, the identification of said material and of the vessel, and the like.

SUMMARY OF THE INVENTION

The needs of the art and objects of the invention mentioned above are satisfied by the present invention which in the agricultural environment comprises a system and methods for correlation of a given cow with the amount of milk produced by her in a particular milking session. Several embodiments of the invention are shown. In a first embodiment, a durable bar coded strip is semi-permanently attached to the animal, e.g., as a cuff around a hind leg. The major portion of the band forming the cuff has the bar code identifying the animal permanently imprinted thereon, such that the animal can be identified by a farmer wanding the bar code. Portable bar code wanding equipment is now available so this poses no technological problem. This identification can be used for a wide variety of purposes. Another use of bar coding in the agricultural environment is provided according to another aspect of the invention, wherein a bar coded scale extending vertically is affixed to a milk collection container, as conventionally used. The vertically extending bar code is divided horizontally into a large number of differing sequential bar code segments, the value encoded in each segment indicating the amount of milk in the container when filled to the level of the particular code segment. A transparent window is provided in the container. Thus, for example, in order to enter a number representative of the pounds of milk output by a given cow into a computer memory, the farmer need simply wand the bar code at the level of the milk within the container. This can automatically be correlated with the identification of the cow, wanded as previously discussed, to provide the required information to the computer. The computer can then use this information in any number of varying calculations such as optimization of the feed provided to the animal, and the like.

Laser technology is also used in reading bar code. In a particularly preferred application, a laser scanner is used to read the bar code fixed to the milk container. If the bar code is substantially translucent and is juxtaposed to a similarly translucent window, or to a plastic milk container, the contrast between the bars and the background of the portion of the bar code between the bars, i.e., the spaces, juxtaposed to the milk will be different from the contrast where juxtaposed only to air, such that the laser will be able to read the bar code only where milk is behind the bar code. The laser scanner, if programmed to scan downwardly and locate the first readable bar code, can thus itself locate the level of the milk in the container and read the corresponding bar code from the label placed thereon, without human interpretation.

BRIEF DESCRIPTION OF THE DRAWINGS

The invention will be better understood if reference is made to the accompanying drawings, in which:

FIG. 3 shows how the band attached to the animal for identification purposes can be constructed;

FIG. 4 is a cross-section taken along the line 4—4 of FIG. 3; and

FIG. 4a is an enlarged view of a portion of the cross-section of FIG. 4.

BRIEF DESCRIPTION OF THE PREFERRED EMBODIMENTS

Figure 1:
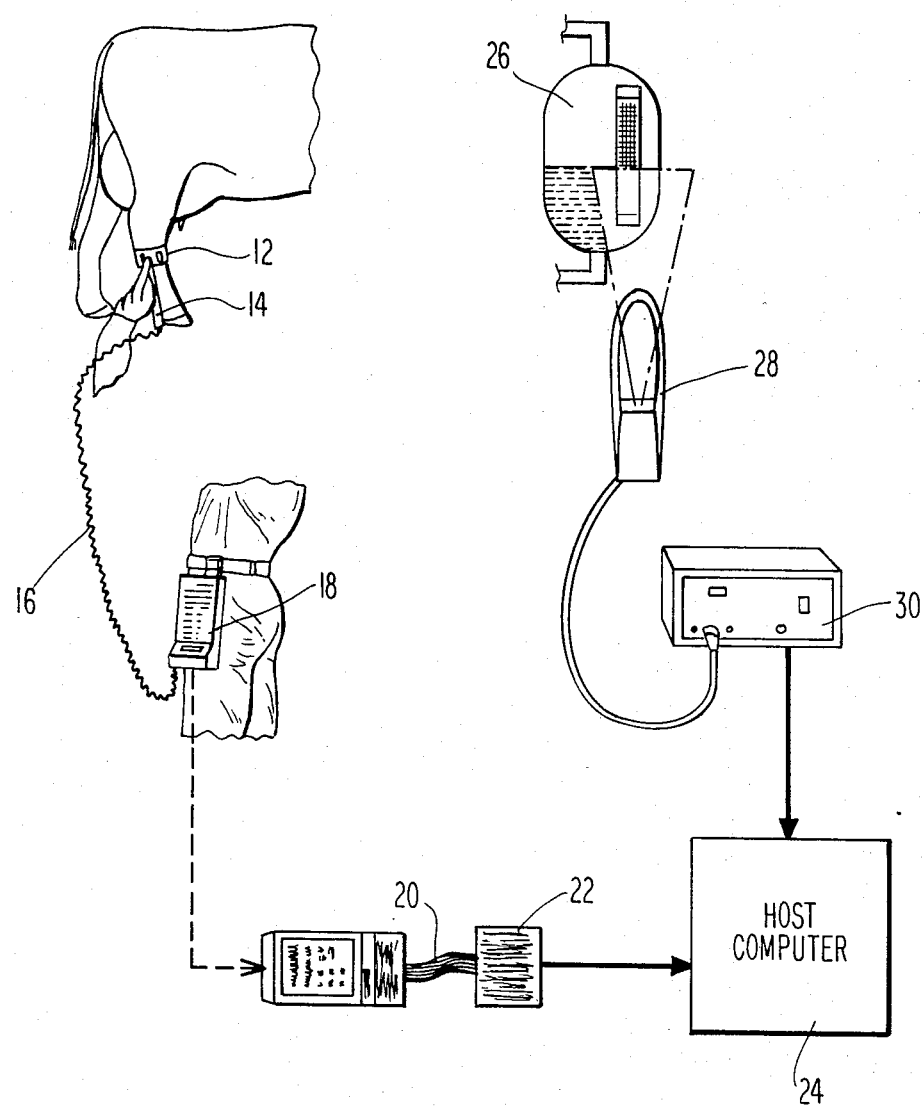
FIG. 1 shows an overview of the system of the invention with several alternatives depicted.

A system according to the invention as applied to identification of a cow and its correlation to the amount of milk given by her in a milking period is shown generally in FIG. 1. A leg band 12 affixed to the leg of a cow is identified by a farmer using an infrared bar code scanning wand 14. In one possible embodiment of the invention, the wand 14 is connected by a flexible cord 16 to a bar code reader 18 which is, for example, carried on the farmer's belt. Such bar code readers are commercially available. For example, the Model 9410 bar code reader from Intermec of Lynnwood, Washington using their Model 1236 infrared wand would be suitable in this application. The data thus read is stored by the reader until at a subsequent time it is connected by way of a multiple conductor cable 20 to a reader interface and battery charger 22 for example that available from Intermec under Model No. 9401, and thence connected, using, e.g., the conventional RS-232C interface protocol, to a host computer 24 which can be any of a number of suitable units, such as the Apple II, the IBM Personal Computer, Radio Shack TRS-80 and others.

The cow identification data, as mentioned, is designed to be correlated with the milk production data. This can be generated according to the invention as follows. A conventional weighing vessel 26 is used in dairy operations to collect the milk output by a given cow in a milking session. Presently, the contents of such vessels are measured by visual comparison to a scale affixed to the outside of the tank 26, or by electronic weighing devices.

The former is time consuming, as in all but the smallest operations the farmer must make a note of the amount of milk, and is subject to human error, while the latter involves very substantial expense. According to the present invention, a vertical strip having a sequence of horizontally-extending bar code segments printed thereon is affixed to the outside of the tank. The tank is made of a translucent material or is provided with a translucent window so that the level of the milk within can be detected by eye, or by machine, as will be discussed below. If the operator desires to input the milk volume, he simply aligns the wand of the infrared bar code reader 14 with the level of the milk and scans across the bar code segment at that level on the strip, thus providing an input to the reader 18. The reader can be programmed to store this amount along with the cow identification, for subsequent "dumping" to the host computer 24 as discussed above. The bar codes used for animal identification and milk quantification can readily be selected to be differentiable from one another by the reader 18, as understood in the art, so that the order in which they are scanned is not critical. These statistics can then be monitored and used in calculation of, e.g., feed amounts for subsequent feedings, or for detection of diseases and other conditions such as "animal in heat" from which it may be determined that the cow may be ready for artificial insemination, and the like.

A second method of inputting data is generally similar but employs a hand-held laser scanner 28, such as, for example, the Intermec Model 1600. This has several advantages, mainly that no physical contact between the scanner and the bar code is required, which may be useful in some applications, especially with bands attached to hind legs, preventing the damage due to the animal's kicking during the scanning procedure; this would also reduce wear on the labels. This laser scanner 28 could also be used to monitor the cow identification tag 12. As a rule, of course, it would be undesirable to have two different scanners at the same work station. The laser scanner can be conventionally connected to a suitable reader 30, e.g. the Intermec Model 9500 which is again connected by way of an RS-232C serial interface to the host computer 24.

Another option would provide automatic detection of the amount of milk in the vessel 26; that is, not requiring the operator to scan across the bar code segment at milk level. This could be accomplished by printing the bar code segment on a strip of substantially translucent material such as Mylar (trademark of DuPont Corporation) and juxtaposing it to a translucent window in the vessel 26. Alternatively, the entire vessel could be made of a translucent plastic such as polyethylene or the like. It will be understood that the contrast between the printed dark lines of the bar code and the translucent plastic is such that a contrast in background will be observed between the bar code segments behind which milk is present and where it is not; that is to say, the white milk provides good background contrast up to its level in the vessel. It is envisioned that a laser scanner as at 28 could be permanently mounted in juxtaposition to the vessel 26 for detecting the change in contrast at the level of the milk and for reading the bar code data at that level, thus eliminating the need for the farmer to wand the data or to scan the vessel. Similarly, laser scanners could be used to identify the animals entering the milking parlor. The necessity of the farmer's wanding the cow identification band 12 would thus be eliminated. Other sorts of cow identification devices, such as radio transponders or the like are also suitable; such devices are in the prior art and are conventionally understood in the industry.

Figure 2:
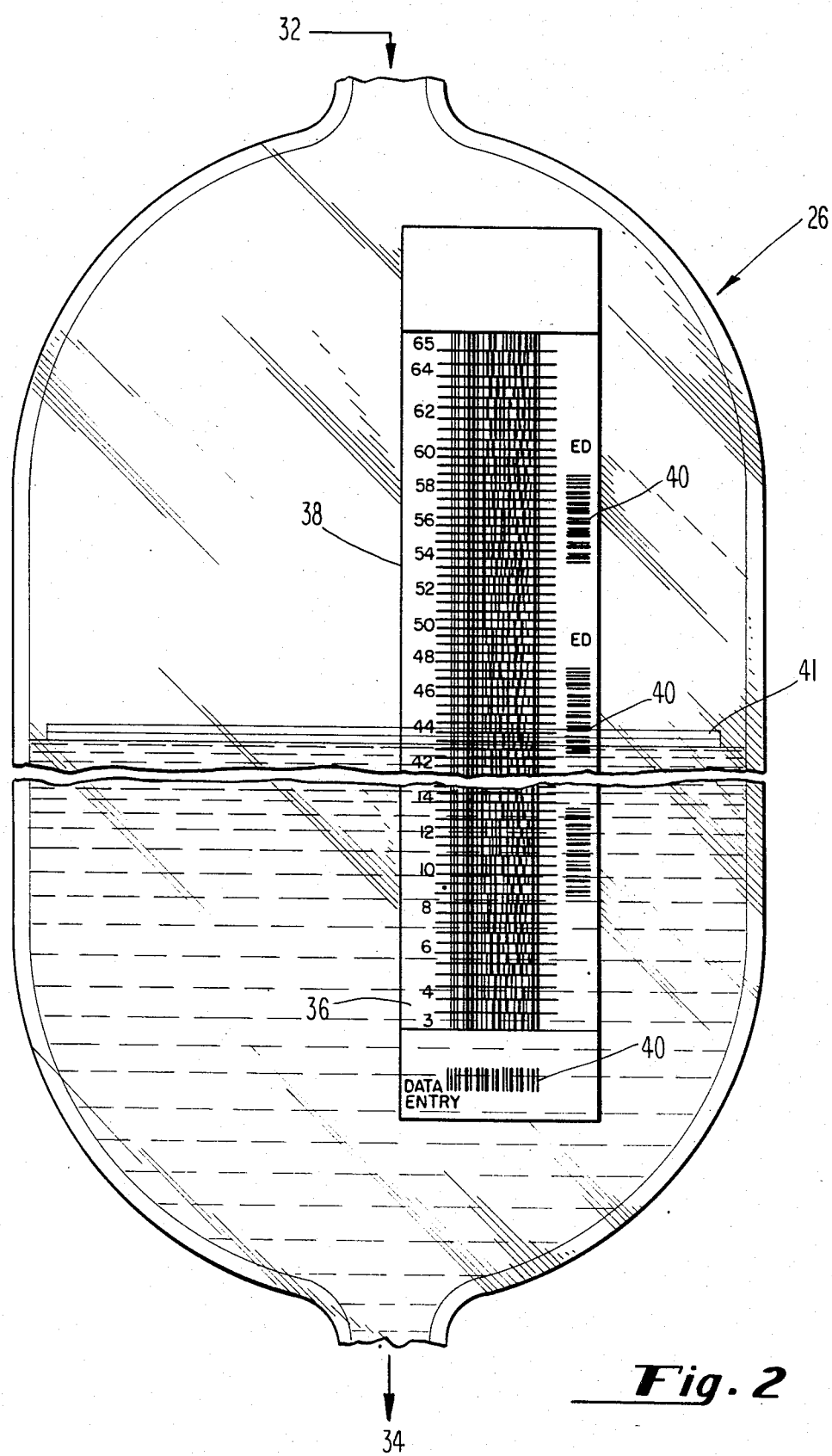
FIG. 2 shows how a bar code scale may be applied to a milk container having a translucent window for easy bar code identification of the level of milk therein.

FIG. 2 shows some additional details of the vessel 26 in which the milk obtained from a cow in a milking session is stored. Typically the milk will be input at the top of the vessel 26 as at 32 and will be drained therefrom at the bottom as indicated at 34, when milking has been completed. As mentioned, the vessel is to be provided with a translucent window 36 or may be formed entirely of translucent material, such as polyethylene, glass or the like. Affixed to a translucent portion of the vessel 26 is a label 38 on which is printed a number of bar code segments, each segment encoding the number of pounds of milk in the vessel when its level reaches the corresponding bar code segment. Thus, for example, at the height within the vessel reached by an amount of milk weighing 29 pounds, a bar code segment representing the number 29 is located. The farmer can then simply move his wand 14 across the bar code segment at the level of the milk and the data will be automatically entered into the reader 18.

It is typical in the art for bar code readers to provide an audible tone when a bar code has been read successfully. When this signal is given, typically the operator will then wand an additional code 40, indicating that the bar code read by the wand is to be stored. These additional codes can be provided at plural locations 40 on the label as shown and may be marked, e.g. "Data Entry." An essentially similar procedure is followed whether an infrared wand 14 or a laser scanner 28 is used. The Data Entry codes 40 could also be used to provide an identification of the vessel.

As mentioned above, when milk in the translucent vessel is juxtaposed to bar code segments printed on a translucent material, a much better contrast between the black lines of the bar code and the background is realized, than in the region above the level of the milk. This can be utilized in automatic reading of the level within the vessel 26, by adjusting the detection threshold of the scanner such that it can only successfully detect codes at the higher contrast, and programming the laser scanner to be scanned downwardly over the vessel 26 and to store the first bar code legibly detected, that is, the highest segment having milk behind it. Such programming of the scanner is well within the skill of the art. This adjustment of the level threshold can also be utilized to differentiate between milk and the foam "head" on the milk; optimization of the size of the spaces, to be approximately equal to the size of the average bubble would also assist in solution of this problem. Another solution would be to employ a float 41, having a high-contrast surface, e.g., a white band against a black background, which would be easily distinguishable from the foam, and would float on the liquid milk, beneath the foam.

It will also be appreciated that bar code measurement of the contents of a vessel has applications far beyond agriculture, and that if the level of clear liquids is to be monitored by scanning, a float 41 can be used to provide a ready reference mark.

FIG. 3 shows a general view of a typical bar code bracelet which can be attached to the leg of a cow, as shown in FIG. 1 at 12. Obviously, such a bracelet can be attached at other portions of the animal; the neck and the tail are clearly suggested. Similarly, bands such as shown may be of use in other applications throughout industry, e.g., in labeling of pipes, bundles of cables in the telephone system, and in other electrical cable applications. Bar code identification of piping, for example, would be especially useful in situations where verbal identification would not be of assistance to a repairman, for example, in a power plant or the like, where the very complexity of the system would make the mere verbal identification of a pipe essentially meaningless. For example, bar code identification could be used in the field to identify a particular pipe on a schematic diagram much more readily than would a simple indication of its contents. Accordingly, it should be recognized that the bracelet shown in FIG. 3 has applications beyond dairy animal identification as described above.

The basic bracelet 12 comprises a band portion 42 and a buckle portion 44. The band portion is shown expanded in FIG. 4a which will be discussed below. In general it comprises a tough, flexible substrate having an elongated bar code permanently printed thereon, shown at 46, suitably protected against weather and the elements, particularly important in the demanding barnyard environment, and provided with additional means for visual identification as necessary. For example, in the example given in FIG. 3, the number encoded by the bar code is 581383. The number 8138 appears on a label 45, which is lined for the color orange. Obviously, other colors, selected for high contrast with the black ink used for printing, could be used. The other digits of the six-digit code number can be used for other coding purposes as desired by the farmer; for example, all bands having the first digit equal to 1 could be used on cows born in 1983; number 2 bands could be used on Holsteins, number 3 bands on Guernseys and so forth. Similarly, the last digit, here shown as a 3 could be used to encode any other desired data concerning the animal in question; this digit might be selected to correspond to the orange tag color, which similarly is indicative of some characteristic of interest.

As shown in FIG. 4, which is a cross-sectional view taken along the line 4—4 of FIG. 3, the band 42 is passed through slots 44a and 44b in the buckle portion. A neoprene foam pad is attached at 48; this prevents chafing of the band against the animal's leg and prevents it from moving down the leg into the mud zone around the hoof. At one end, the band 42 is affixed to the buckle 44 by one or more stainless steel rivets 50, or the equivalent. Its other end is passed through the two slots 44a and 44b and is held in position by a permanently attached rivet 51. The resilient and relatively stiff nature of the band material (discussed in detail below) holds the band on the rivet 51, but it can be flexed sufficiently to allow removal, if desired. On the other hand, if permanence of the band's installation on the animal is required, e.g., for breeding registry purposes, this can be readily achieved by use of a second rivet 52, which may be attached by epoxy or the like; to remove this rivet will destroy or damage the buckle, indicating that it has been tampered with. Staples of stainless steel or other durable material could also be used to complete the band's end-to-end connection.

FIG. 4a shows an expanded view of the structure of the band portion 42. It comprises a base layer 54 which may be a 10 mil Mylar strip. A layer of double-sided cloth carpet tape is then applied at 56. This is used to adhesively affix a second 7 mil thick clear Mylar strip 58 having the bar code and the ID label printed on one side 58a thereof. After application of the bar code and the ID label to side 58a, a coat of paint, white or some other desired high contrast color, is applied, preventing the bar code from being destroyed if delamination of the strip occurs. The painted surface is then attached by way of the cloth carpet tape 56 to the support strip 54. The assembly can then be riveted by rivets 50 to the buckle member 44 which can readily be formed of ⅛ inch polyvinylchloride plastic sheet. As mentioned, the other end of the band can then be attached to the buckle by pins 51 and 52; use of pins which cannot be removed in order to provide permanent animal identification is useful for breeding and registry purposes. These pins can be formed with barbs on their surface for interaction with the holes in the buckle member 44 so as to prevent removal and can be formed of durable materials such as plastic, brass or stainless steel. Alternatively, the buckle assembly can be dispensed with in favor of simply stapling the band so as to encircle the animal's leg.

Printing of the bar code along the total length of the band provides almost 360° of availability of the bar code to a scanner, which is very convenient for rapid scanning. This also prevents any one area on the band from being worn out due to frequent scanning in the same place, and permits scanning even if a portion of the bar code becomes obscured or unreadable for some reason. Desirably, the ID label text and the bar code itself are computer generated and printed directly on a master Mylar film. This can then be reverse copied onto the 7 mil upper layer of Mylar 58, in a conventional photocopy process. The color coating of the label area and high contrast coating in the bar code region will serve to prevent destruction of the label text and the bar code in the event of delamination of the band, e.g., due to aging of the carpet tape or other adhesive medium used. The coating can be paint or colored tape. After construction as described above, the band is preferably formed in an oval by placing the laminated band around an oval wooden mold and baking, e.g., for 15 minutes at 160° F. After the band and mold is removed from the oven it retains this oval curvature permanently, which reduces stress on the band and reduces the chance of delamination. It is envisioned that eventually more advanced techniques could be devised for manufacture of the encoded strip; ideally, the operator would simply input the desired number on a keypad and a programmed computer device would control a dedicated printer to generate the appropriate bar coded strip. It is believed that such devices are within the skill of the art, although the inventor herein is not aware of any presently available devices of this type.

It will be recognized by those skilled in the art that other methods of manufacture of an identification bracelet carrying bar code information are possible. For example, a base strip material of a flexible vinyl material on the order of ⅛ inch thick can be used. This is spray painted after proper cleaning. Use of a white epoxy primer paint such as that sold under the tradename "Zynolyte" appears appropriate. The bar code can then be printed directly thereon using high carbon inks. A thin clear vinyl film can be applied over the bar code to prevent it from being destroyed, e.g., by scratching or the like. Other buckle structures are similarly possible.

The selection of the bar code used is also a matter of design choice. The inventor personally favors the industry-standard "interleaved" 2 of 5 code, with which a wide variety of commercially available equipment is designed to cooperate.

Those skilled in the art will recognize that the choice of scanning device has some bearing on the materials selected for use in the bracelet according to the invention and also on the bar coded label applied to the milk vessel. If an infrared scanner is to be used, which is desirable to reduce interference from ambient light and to provide improved signal-to-noise ratio, the vinyl, Mylar or other substrate material used must absorb sufficient ink to give reliable, infrared bar code detection. Use of carbon inks is indicated because the cow will be outside a substantial amount of time, so that an ink having good resistance to ultraviolet radiation damage from sunlight is clearly indicated. As mentioned, the inventor has found that a flat, white epoxy primer paint sold under the tradename "Zynolyte" is a useful background coating. This paint is available in a number of contrasting colors which can be used for additional identification of the animal by characteristics, e.g., breed, source and the like. As mentioned, colored tape could be used as background.

Those skilled in the art will recognize that there are additional ways of making durable bands having bar code animal identification printed thereon. Similarly, wide variation in effective buckle design is possible, and the bar codes used can be adapted to a wide variety of actual requirements.

Those skilled in the art should also recognize that the methods and apparatus described herein have application to industrial uses other than in agriculture. For example, the level of a wide variety of liquids in vessels and the like can be readily and accurately monitored by affixing thereto a bar code readable label such as shown in FIG. 2 and providing a workman with an infrared or laser scanning device. A bar coded label could similarly be juxtaposed to a conventional sight glass. As mentioned above, in some environments it will be possible to adapt the laser scanner or wand to read the bar code of the level directly, without operator intervention. Similarly, it would be useful and readily feasible to have a user scan a bar code identifying the vessel at the same time he scans the bar code indicating the liquid level within the vessel, thus identifying the vessel and measuring its contents in a single operation, analogous to identification of a cow with the amount of milk received from her in a given period. In this way, for example, an operator could provide a correlation between a vessel number and the level of its contents by simply scanning a single bar coded label, where the vessel number or location is given within the level scale without ever having to explicitly note which vessel contents he was measuring nor himself noting the actual liquid level therein, thus greatly simplifying the procedure and reducing the chance of human error. This would be a particularly useful method of monitoring complex laboratory processes, e.g., in the biotechnology field, where a large number of standardized glass vessels, e.g., the typical frustoconical "Dewar" flasks, are used. It would be a simple matter to generate standard bar code label scales having their segments spaced in accordance with the variation in volume per unit spacing due to the conical shape of the flask, and provide these labels corresponding to the conventionally sized flasks, e.g., 200, 500, 1000 and 2000 ml. Such labels could readily be provided with adhesive backing so as to be adhesively affixed to the flasks. Similarly, it would be straightforward to provide a device which would print a bar code label in response to an operator input of a text identifier and/or code number, e.g., NUTRIENT MEDIA: CODE NO. 4621 could be input, and the bar code for "4621" automatically generated. Such a label could then be adhesively attached to the appropriate flask upon set-up of an experiment. Thereafter, monitoring the experiment would be a simple matter of wanding or scanning the label on each flask and the bar code scale segment at the level of the liquid in the flask.

Similarly, segmented bar code scales could be juxtaposed to thermometers, for scanning of temperature, to provide additional input; this might well be cost effective when compared to conventional combinations of thermocouples and analog-to-digital converters, now used for automatic input of temperature data to a monitoring computer.

Ultimately, it can be envisioned that bar-coded labels standardized to match conventional flasks and thermometers, as well as other calibrated quantities could be sold together with identifying bar coded labels, appropriate scanning equipment, and computer software. When a given experiment is being set up, the appropriate bar coded labels would be attached to the various flasks, and other apparatus, and the correlative identification information input to a suitable computer. When the experiment is thereafter run, its progress could be monitored by simply wanding the bar codes representing the analog values and the identifying labels at intervals. The computer could then correlate the bar code segments read with the identifying information and could even graph the results, perform statistical analysis and so forth, all without any operator's ever having to note a volume, record a temperature, or even identify a flask. Bar code labels could also be printed to be juxtaposed around circular dial faces; the bar code segments would extend radially for scanning at the position of the indicating needle.

Finally, it should also be realized that automatic scanning of bar code labels indicative of volume, vessel identification, temperature, as well as other process parameters and variables, is intended to be within the scope of this application.

Therefore, while a preferred embodiment of the invention has been discussed, it should be realized that the invention is not to be limited thereby, but only by the following claims.

I claim:

1. Apparatus for reading a number indicative of an amount of milk, for reading an identification number assigned to a cow, and for correlating said numbers, comprising:
    an identifying tag affixed to a cow comprising a bar code encoding the identification number of such cow;
    a bar code scale attached to a predeterminded milk containing vessel, said bar code scale comprising a number of bar code segments, each segment encoding a number corresponding to the relative amount of milk in said vessel when the level of milk in said vessel is at the height of the segment;
    bar code scanner means for reading said bar code from said identifying tag and a bar code from a selected segment of said scale;
    means for storing the bar codes thus read; and
    means for correlating the bar codes thus read in order to correlate the number encoded by the segment of said scale read with the identification of said cow.

2. The system of claim 1 wherein said identifying tag adapted to be attached to said cow is a band-like bracelet comprising buckle means adapted to be affixed to a portion of the anatomy of said cow and having bar codes printed thereon and extending substantially therearound, whereby said scanner can identify said cow by scanning substantially any portion of said bracelet.

3. The scale of claim 1 wherein said scale is translucent and milk within said vessel provides a contrasting background against which scanning can be effectively performed.

4. A system for correlating numbers indicative of amounts of milk with identifications of cows in a dairy herd comprising:
    an identification tag affixed to each of said cows, each of said tags comprising a bar code encoding a respective identification symbol assigned to the cow to which it is affixed;
    a plurality of containers, each container having associated therewith bar coded means for providing a plurality of respective bar coded segments, said bar coded means being positioned with respect to said each container so that the number encoded by each respective segment corresponds to a respective amount of milk in said each container;
    scanner means for reading the bar coded cow identification symbols from said tags, and for reading a selected bar coded number from a segment of each of said bar coded means;
    memory means for storing said symbols and numbers; and
    means for correlating each identification symbol of a cow with a corresponding number.

5. The system of claim 4, wherein each said identifcation tag comprises an elongated strip affixed to and encircling a portion of the cow's anatomy.

6. Method of correlating the amount of milk in a vessel produced by a cow with an identification of said cow, comprising the steps of:
    affixing an identification tag to said cow, said tag comprising a bar code encoding a symbol indicative of the identity of the cow;
    providing on said vessel a plurality of bar coded segments, said segments encoding respective numbers corresponding to respective amounts of milk in said vessel, and positioning said segments so as to correspond to the level of milk in said vessel when it contains said respective amounts;
    scanning the bar coded identification symbol of said cow from its identification tag;
    scanning the one of said segments encoding the number corresponding to the amount of milk in said vessel;
    storing the bar codes thus read; and
    correlating the bar code identifying said cow to the segment indicative of the amount of milk in said vessel.

7. The method of claim 6 wherein said step of affixing an identifying tag to said cow comprises the step of encircling an elongated tag about a portion of the animal's anatomy.

8. A system for identifying each cow in a herd and for correlating identification of said cow with milk produced by said cow, the system comprising;
    machine-readable identification tag means for providing an encoded symbol indicative of a cow's identity affixed to the cow;
    label means attached in predetermined relation to a milk vessel containing milk produced by said cow, for providing machine-readable endoded symbols indicative of relative amounts of milk in said vessel;
    scanner means for scanning said identification tag and for scanning said label means;

means for decoding and storing the symbols read by said scanner means; and means for correlating identification of the cows with the symbols read from the label.

9. The system of claim 8 wherein said machine-readable symbols are bar codes and said scanner is a bar code reader.

10. A method of obtaining and correlating identification and milk data for a cow in a herd, the method utilizing a bar coded identification tag on said cow and a vessel in which milk produced by said cow is contained, said vessel having thereon a plurality of bar coded segments, each said segment being positioned at a respective level on said vessel and being encoded to provide data corresponding to the amount of milk in said vessel when the milk is at or about said respective level, comprising the steps of:

scanning said identification tag to obtain identification data and storing said identification data, scanning the one of said segments that corresponds most closely to the level of milk in said vessel to obtain milk data and storing said milk data, and correlating said identification data and said milk data.

* * * * *